US011845469B2

(12) United States Patent
Hsiao et al.

(10) Patent No.: US 11,845,469 B2
(45) Date of Patent: Dec. 19, 2023

(54) YELLOW LIGHT DURATIONS FOR AUTONOMOUS VEHICLES

(71) Applicant: Waymo LLC, Mountain View, CA (US)

(72) Inventors: Edward Hsiao, Sunnyvale, CA (US); Maoqing Yao, Newark, CA (US); David Margines, Sunnyvale, CA (US); Yosuke Higashi, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 223 days.

(21) Appl. No.: 16/915,253

(22) Filed: Jun. 29, 2020

(65) Prior Publication Data

US 2021/0403047 A1 Dec. 30, 2021

(51) Int. Cl.
*B60W 60/00* (2020.01)
*G05D 1/00* (2006.01)
*G08G 1/095* (2006.01)

(52) U.S. Cl.
CPC ....... *B60W 60/0025* (2020.02); *G05D 1/0088* (2013.01); *G08G 1/095* (2013.01); *B60W 2552/00* (2020.02)

(58) Field of Classification Search
None
See application file for complete search history.

(56) References Cited

U.S. PATENT DOCUMENTS 10,259,457 B2  4/2019  Meyer et al.
10,377,378 B2  8/2019  Gutmann et al.
2008/0150757 A1*  6/2008  Hutchison ............... G08G 1/095 340/907
2016/0035223 A1*  2/2016  Gutmann ........ B60W 30/18154 340/907
2019/0041228 A1  2/2019  Singhal
2019/0206247 A1  7/2019  Xie et al.
2021/0304608 A1*  9/2021  Clark .................... B60W 50/14

FOREIGN PATENT DOCUMENTS

WO   WO-2019222358 A1 *  11/2019  ......... G01C 21/3602

OTHER PUBLICATIONS

PhotoEnforced.Com, Feb. 3, 2019, Syndicated Maps, https://blog.photoenforced.com/2011/02/what-is-proper-length-for-yellow-light.html (Year: 2019).*
Kris Efland, et al., Semantic Maps for Autonomous Vehicles, https://medium.com/lyftlevel5/semantic-maps-for-autonomous-vehicles-470830ee28b6, retrieved from internet Mar. 25, 2020, pp. 1-8.

* cited by examiner

*Primary Examiner* — Khoi H Tran
*Assistant Examiner* — Tristan J Greiner
(74) *Attorney, Agent, or Firm* — Botos Churchill IP Law

(57) ABSTRACT

Aspects of the disclosure relate to controlling a vehicle having an autonomous driving mode. For instance, a current state of a traffic light may be determined. One of a plurality of yellow light durations may be selected based on the current state of the traffic light. When the traffic light will turn red may be predicted based on the selected one. The prediction may be used to control the vehicle in the autonomous driving mode.

22 Claims, 8 Drawing Sheets

YELLOW LIGHT DURATIONS FOR AUTONOMOUS VEHICLES

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using sensors such as cameras, radar, LIDAR sensors, and other similar devices. For instance, the perception system and/or the vehicle's computing devices may process data from these sensors in order to identify objects as well as their characteristics such as location, shape, size, orientation, heading, acceleration or deceleration, type, status, etc. This information is critical to allowing the vehicle's computing systems to make appropriate driving decisions for the vehicle.

SUMMARY

Figure 1:
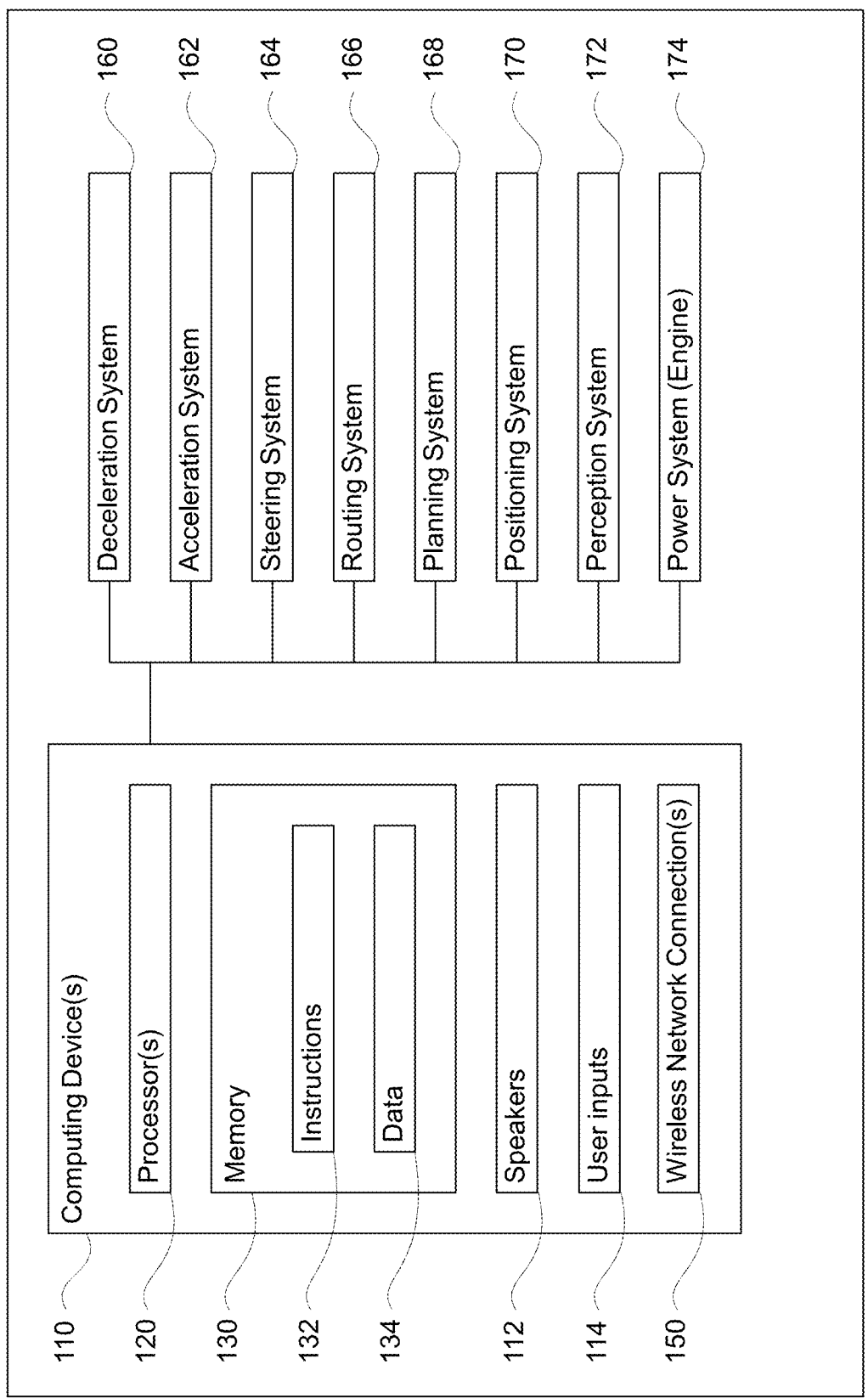
FIG. 1 is a functional diagram of an example vehicle in accordance with aspects of the disclosure.

Aspects of the disclosure provide a method of controlling a vehicle having an autonomous driving mode. The method includes receiving, by one or more processors of one or more computing devices of the vehicle, a current state of a traffic light; selecting, by the one or more processors, one of a plurality of yellow light durations based on the current state of the traffic light; predicting when the traffic light will turn red based on the selected one; and using, by the one or more processors, the prediction to control the vehicle in the autonomous driving mode.

In one example, the method also includes receiving, by the one or more processors, an updated state of the traffic light and selecting, by the one or more processors, a second one of the plurality of yellow light durations based on the updated state of the traffic light. In this example, the selected one and the second one are different durations. In addition, selecting the second one is done independent of any state of the traffic light prior to the updated state of the traffic light. In another example, In another example, the method also includes determining when the traffic light was last observed in a particular state, and wherein predicting when the traffic light will turn red is further based on the determination of when the traffic light was last observed in the particular state. In this example, the particular state is a flashing yellow light. Alternatively, the particular state is a flashing green light. In another example, the plurality of yellow light durations includes a first yellow light duration for a solid green circle state of the traffic light and a second yellow light duration for a green arrow state of the traffic light, wherein the first yellow light duration and the second yellow light duration are different durations. In another example, the plurality of yellow light durations includes a first yellow light duration for a solid green arrow state of the traffic light and a second yellow light duration for a flashing yellow arrow state of the traffic light, wherein the first yellow light duration and the second yellow light duration are different durations. In another example, the plurality of yellow light durations is stored in a table associated with the traffic light and selecting the one of the plurality of yellow light durations includes accessing the table. In this example, the method also includes determining, by the one or more processors, a duration of a yellow light of the traffic light and storing the determined duration for later use. In this example, the method also includes sending the determined duration to a remote computing device.

Another aspect of the disclosure provides a system for controlling a vehicle having an autonomous driving mode. The system includes one or more processors configured to receive a current state of a traffic light; select one of a plurality of yellow light durations based on the current state of the traffic light; predict when the traffic light will turn red based on the selected one; and use the prediction to control the vehicle in the autonomous driving mode.

In one example, the system also includes the vehicle. In another example, the one or more processors are further configured to receive an updated state of the traffic light; and select a second one of the plurality of yellow light durations based on the updated state of the traffic light. In this example, the selected one and the second one are different durations. In addition, the one or more processors are further configured to select the second one independent of any state of the traffic light prior to the updated state of the traffic light. In another example, the plurality of yellow light durations includes a first yellow light duration for a solid green circle state of the traffic light and a second yellow light duration for a green arrow state of the traffic light, wherein the first yellow light duration and the second yellow light duration are different durations. In another example, the plurality of yellow light durations includes a first yellow light duration for a green arrow state of the traffic light and a second yellow light duration for a flashing yellow arrow state of the traffic light, wherein the first yellow light duration and the second yellow light duration are different durations. In another example, the system also includes memory storing a table including the plurality of yellow light durations, and wherein the one or more processors are further configured to access the table in order to select the one of the plurality of yellow light durations includes. In this example, the one or more processors are further configured to determine a duration of a yellow light of the traffic light and store the determined duration for later use. In another example, the one or more processors are further configured to send the determined duration to a remote computing device.

DETAILED DESCRIPTION

Overview

The technology relates to enabling autonomous vehicles to respond to yellow traffic lights. For instance, when an autonomous vehicle's perception system observes a yellow light at a traffic light intersection, the vehicle's computing devices must decide whether the vehicle should stop or proceed through the intersection. Current approaches for such determinations may involve pre-storing default traffic light durations based on the speed of the traffic lanes at an intersection, geometry of the traffic lanes, and/or other formulas used by city or other governmental bodies to set yellow light durations. However, in reality, there may be a lack of consistency as to how these durations are set across the country and even in the same city. Thus, in many instances, yellow lights may be significantly shorter or longer than expected, which can result in an autonomous vehicle running a red light or stopping immediately resulting in a hard-braking event when there was sufficient time to proceed through the intersection. Other approaches which may include communicating with or receiving information from a traffic light about the duration of a yellow light may not be practical for widespread use.

To address these shortcomings, rather than simply pre-storing a default yellow light duration for a traffic light, a plurality of default yellow light durations may be stored based upon different possible transitions for that traffic light. For instance, while some traffic lights may only have transitions from green to yellow to red to green again, other types of traffic lights may have different types of transitions. For instance, a yellow light duration of a solid left yellow arrow for a traffic light may be different depending upon the transition. For example, when the traffic light transitions from flashing left yellow arrow (FLYA) to solid left yellow arrow (SLYA), the duration of the SLYA may be different from the duration of the SLYA when the traffic light transitions from solid left green arrow (SLGA) to SLYA. Other examples are possible. Thus, for each of the different possible transitions for a traffic light, a different default yellow light duration may be stored The yellow light durations may be determined in various ways. For instance, human labelers may be asked to label the durations of the yellow lights from videos. As another approach, the durations may be automatically determined by an onboard traffic light detection system software module of an autonomous vehicle.

In use, as an autonomous vehicle approaches a traffic light, the vehicle's traffic light detection system software module will attempt to detect the current state of the traffic light. Based on the current state of the traffic light, the vehicle's computing devices may determine a duration of the next or current yellow light for the traffic light. In this regard, the vehicle's computing devices may access a pre-stored table of traffic light durations for the traffic light and select a yellow light duration. This selected yellow light duration may then be used to predict when the traffic light will turn red and in turn, to determine whether or not the vehicle should stop for the traffic light.

This information may also be shared with a remote computing device, such as a backend server computing device. If there is enough of a difference between the duration of the table and an observed duration, this may be used as a signal to flag the traffic light for additional analysis. In addition or alternatively, the server computing device can broadcast the information to other nearby vehicles or all vehicles of a fleet of vehicles. The differences may also be used to determine whether there is any specific distribution, e.g., a bimodal distribution, for a particular traffic light. For example, the yellow light durations may possibly change at different times of day and/or days of the week (e.g. longer during rush hour or less busy times).

The features described herein may enable autonomous vehicles to recognize and respond to different yellow light durations for a single traffic light. This may reduce the likelihood of such vehicles from running red lights or abruptly braking at an inappropriate time.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers 112 as well as one or more user inputs 114.

The speakers may enable the computing devices to provide audible messages and information, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or one or more linear resonant actuators placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semi-autonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode. In this regard, each of these systems may de one or more processors, memory, data and instructions. Such processors, memories, instructions and data may be configured similarly to one or more processors 120, memory 130, instructions 132, and data 134 of computing device 110.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 2:
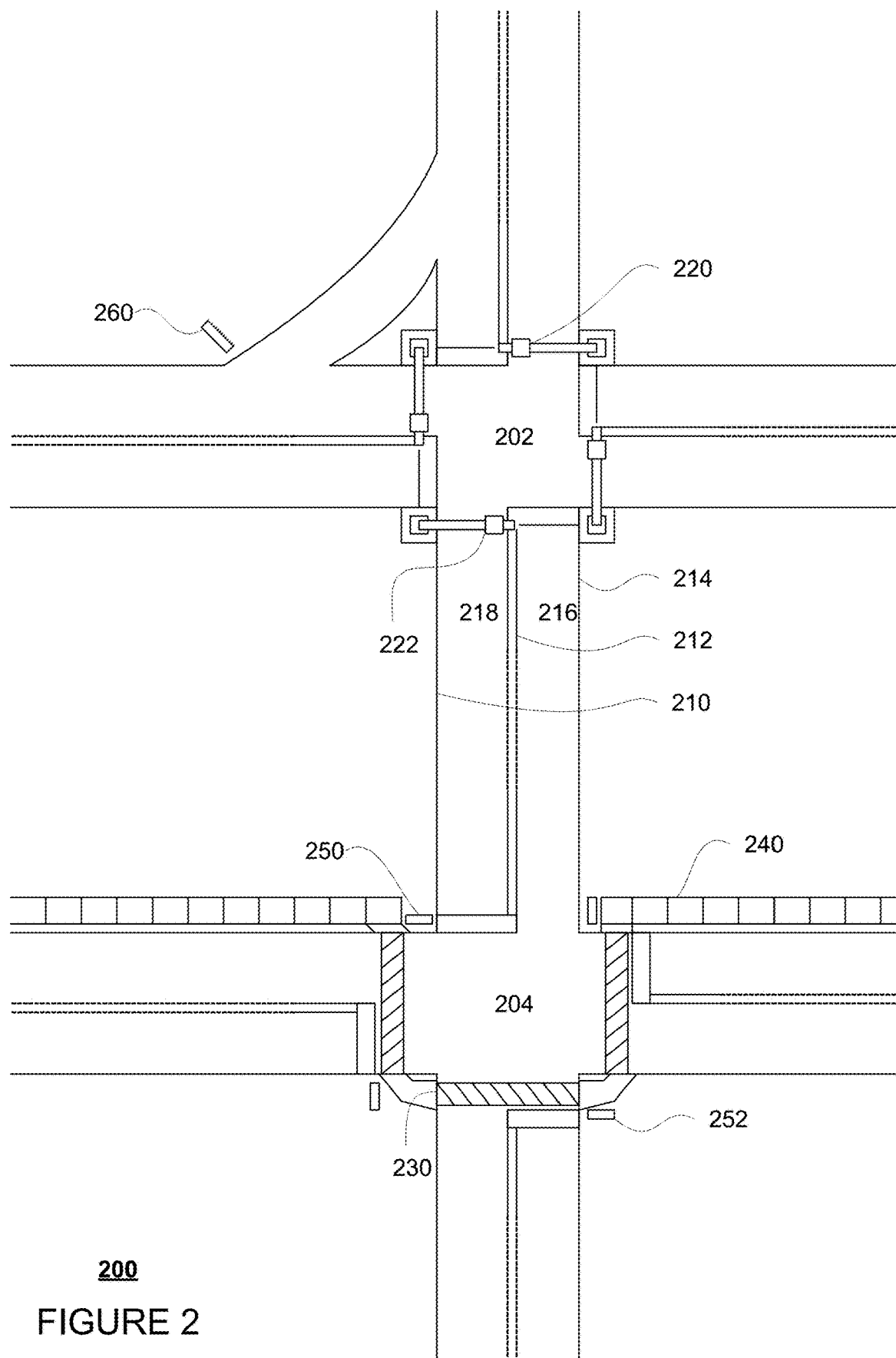
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214 which define lanes 216, 218, traffic lights 220, 222, stop line 224, crosswalk 230, sidewalks 240, stop signs 250, 252, and yield sign 260. In this regard, the map information includes the three-dimensional (3D) locations of traffic lights 220, 222 as well as information identifying the lanes which are controlled by these traffic lights.

In some examples, the map information may identify additional information about traffic lights. This information may include, for example, expected states and durations (e.g. how long should a green, yellow or red light last) as well as information identifying which lanes the traffic light controls. In this regard, the map information may store expected states and durations for traffic lights 220, 222 as well as information indicating that these traffic lights control lanes 216, 218, respectively.

However, rather than simply pre-storing a default yellow light duration for a traffic light, a plurality of default yellow light durations may be stored based upon different possible transitions for that traffic light. For instance, while some traffic lights may only have transitions from green to yellow to red to green again, other types of traffic lights may have different types of transitions, such as from flashing yellow to a solid yellow.

For a first example, traffic light 220 may include four lights or four light states. These lights or light states may include a solid left red arrow (SLRA), solid left yellow arrow (SLYA), flashing left yellow arrow (FLYA) and solid left green arrow (SLGA). The yellow light duration of the solid left yellow arrow (SLYA) for the traffic light 220 may be different depending upon the transition. For instance, when the traffic light transitions from FLYA to SLYA, the duration of the SLYA may be different from the duration of the SLYA when the traffic light transitions from SLGA to SLYA.

As a second example, traffic light 222 may include four lights or four light states. These lights or light states may include a solid red circle (SRC), solid green arrow (SGA), solid green circle (SGC), and a solid yellow circle (SYC). The yellow light duration of the solid yellow circle (SYC) for the traffic light 222 may be different depending upon the transition. For instance, when the traffic light transitions from SGC to SYC, the duration of the SYC may be different from the duration of the SYC when the traffic light transitions from SGA to SYC.

Different transitions can also occur with other traffic light configurations where there are multiple green elements, such as circles and arrows, with only a single yellow light.

Thus, for each of the different possible transitions for a traffic light, a different default yellow light duration may be stored. For instance, these durations for each respective traffic light may be stored, for instance in any number of data structures such as a look up table, an array, etc., and in some instances appended to map information used to control the vehicle. In this regard, all or some of the traffic lights in the map information may be associated with individual tables identifying the durations. Some traffic lights (such as those with only three lights) may be associated with only a single default yellow light duration, while other traffic lights may be associated with a plurality of default yellow light durations (one for each possible transition).

For example, Table 1 below is an example table for the traffic light 220. In this example, Duration 1 is different from Duration 2. This table may be appended to the map information 200 and thus, pre-stored.

TABLE 1

| Traffic Light 220 | | |
|---|---|---|
| Observed Light State | Next Yellow Light | Next Yellow Light Duration |
| FLYA | SLYA | Duration 1 |
| SLGA | SLYA | Duration 2 |

For another example, Table 2 below is an example table for the traffic light 222. In this example, Duration 3 is different from Duration 4. Again, this table may be appended to the map information 200 and thus, pre-stored.

TABLE 2

| Traffic Light 222 | | |
|---|---|---|
| Observed Light State | Next Yellow Light | Next Yellow Light Duration |
| SLGA | SYC | Duration 3 |
| SGC | SYC | Duration 4 |

Of course, if there are not enough observations and data for a particular traffic light, there may be no table for that particular traffic light. If there is no table for a particular traffic light, a default yellow light duration based on the speed of the traffic lanes at an intersection, geometry of the traffic lanes, and/or other formulas used by city or other governmental bodies to set yellow light durations may be used.

The yellow light durations may be determined in various ways. For instance, human labelers may be asked to label the durations of the yellow lights from videos. For example, for different frames (or images) of traffic lights, a human labeler can identify the first frame a yellow light is observed and a last frame the yellow light is observed, and the amount of time between those frames can be extrapolated. However since human labelers are not perfect there will be slight variations in their labels, so an average value over a plurality of different observations of the same traffic light may be used for a particular yellow light duration.

As another approach, the durations may be automatically determined by the onboard traffic light detection system software module of an autonomous vehicle. This data may be much noisier since lights may be occluded, mis-detected, and other heuristics may change the yellow light timing. Also, it may be difficult to determine which are reliable segments of sensor data from which to extract these yellow light durations. However, by determining yellow light durations in real time, this may be useful to detect changes to the pre-stored durations entered and can be used to flag which traffic lights need to be updated.

While the map information may be an image-based map, the map information need not be entirely image based (for example, raster). For example, the map information may include one or more roadgraphs or graph networks of information such as roads, lanes, intersections represented as nodes, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map and/or on the earth. The positioning system 170 may also include a GPS receiver to determine the device's latitude, longitude and/or altitude position relative to the Earth. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
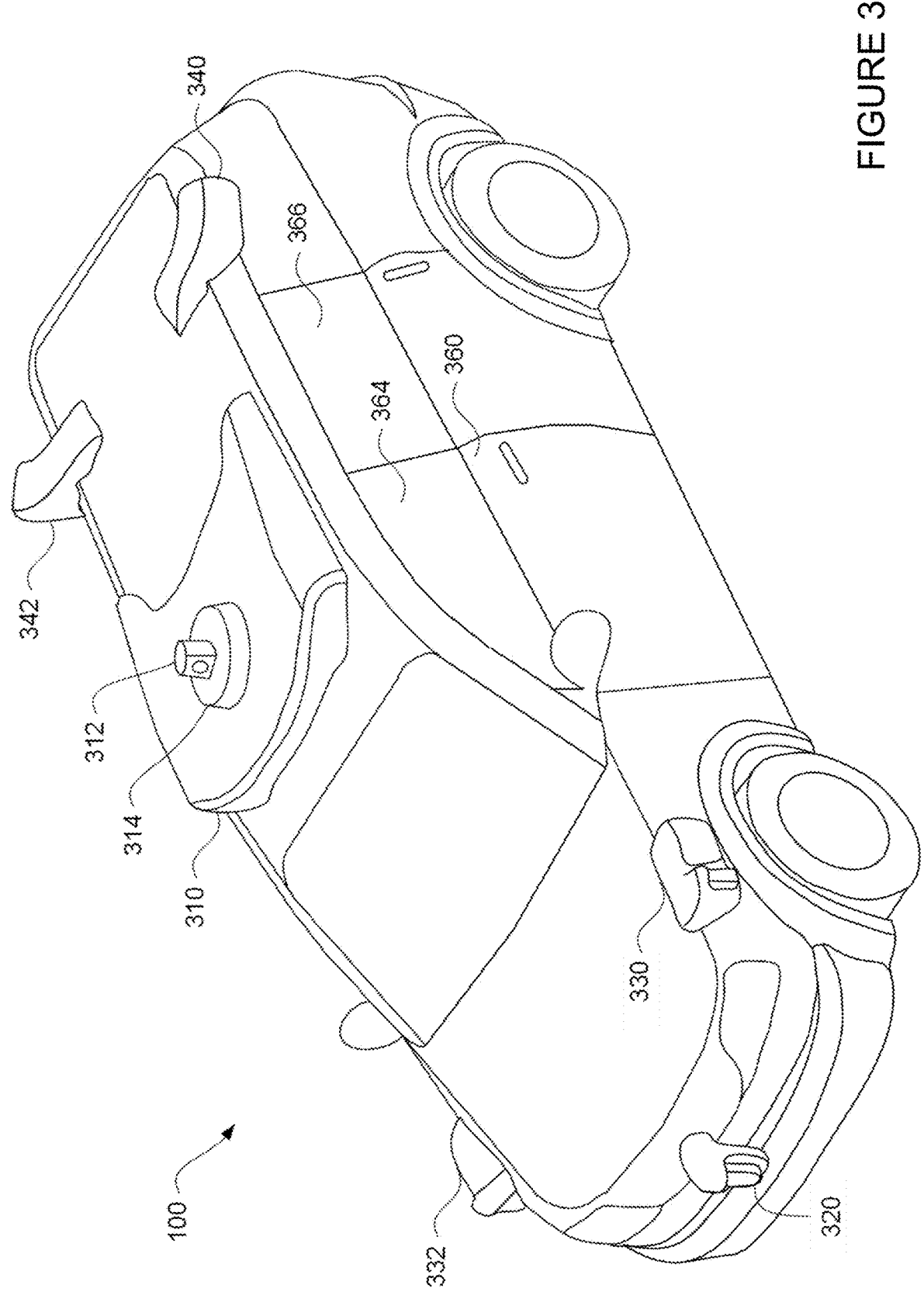
FIG. 3 is an example diagram of a vehicle in accordance with aspects of the disclosure.

For instance, FIG. 3 is an example external view of vehicle 100. In this example, roof-top housing 310 and roof-top housings 312, 314 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of doors 360, 362 which also include windows 364, 366. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software systems or modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. These detection system software modules may be incorporated into the perception system 172 or the computing devices 110. Each of these detection system software modules may input sensor data generated by the perception system 172 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

Computing devices 110 may also include one or more wireless network connections 150 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
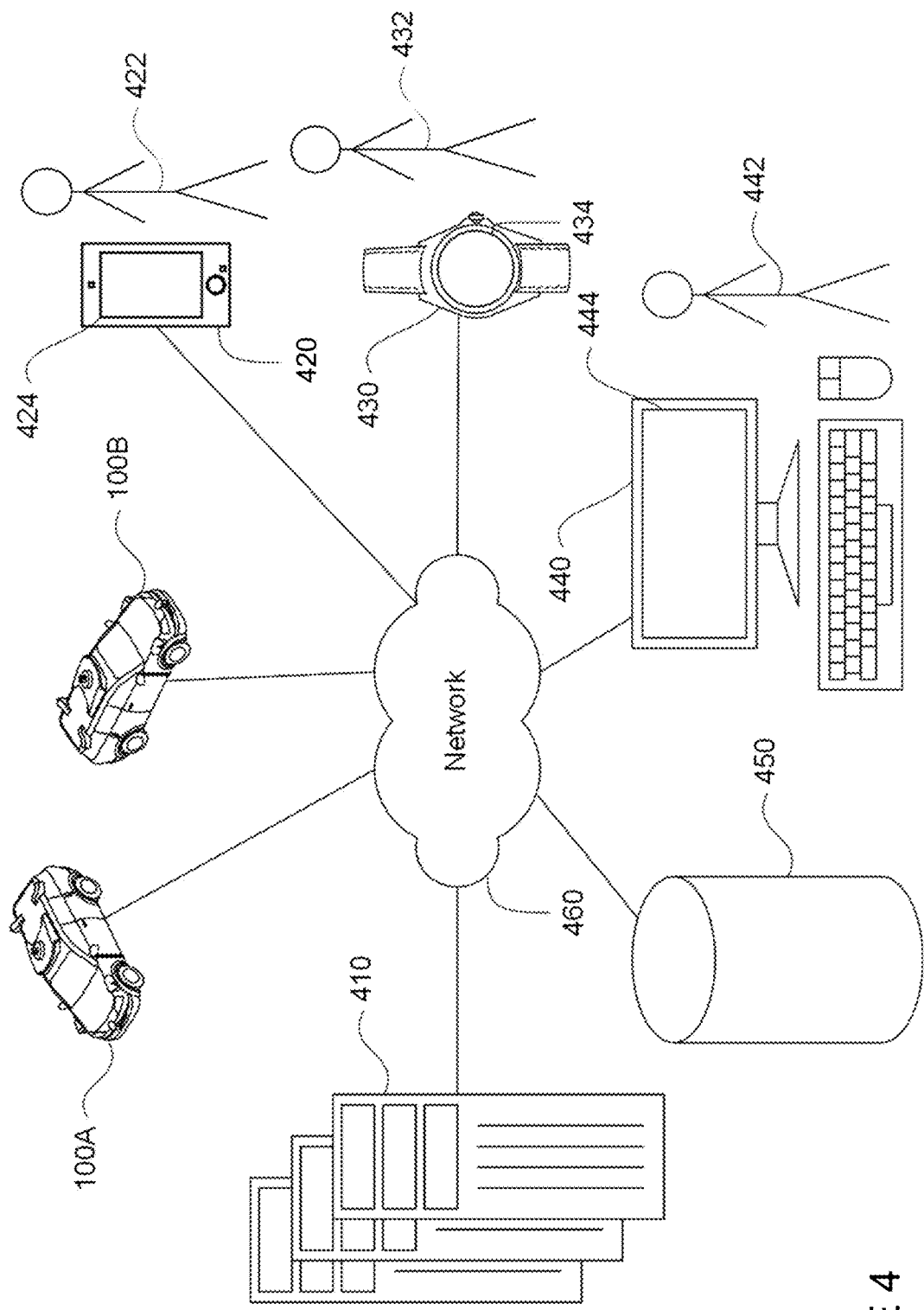
FIG. 4 is an example pictorial diagram of a system in accordance with aspects of the disclosure.

Computing device 110 of vehicle 100 may also receive or transfer information to and from other computing devices, such as those computing devices that are a part of the transportation service as well as other computing devices. FIGS. 3 and 4 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, instructions and data. Such processors, memories, data and instructions may be configured similarly to one or more processors 120, memory 130, instructions 132 and data 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touchscreen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise client computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, depicted as a smart watch as shown in FIG. 4. As an example the user may input information using a small keyboard, a keypad, microphone, using visual signals with a camera, or a touch screen.

Figure 5:
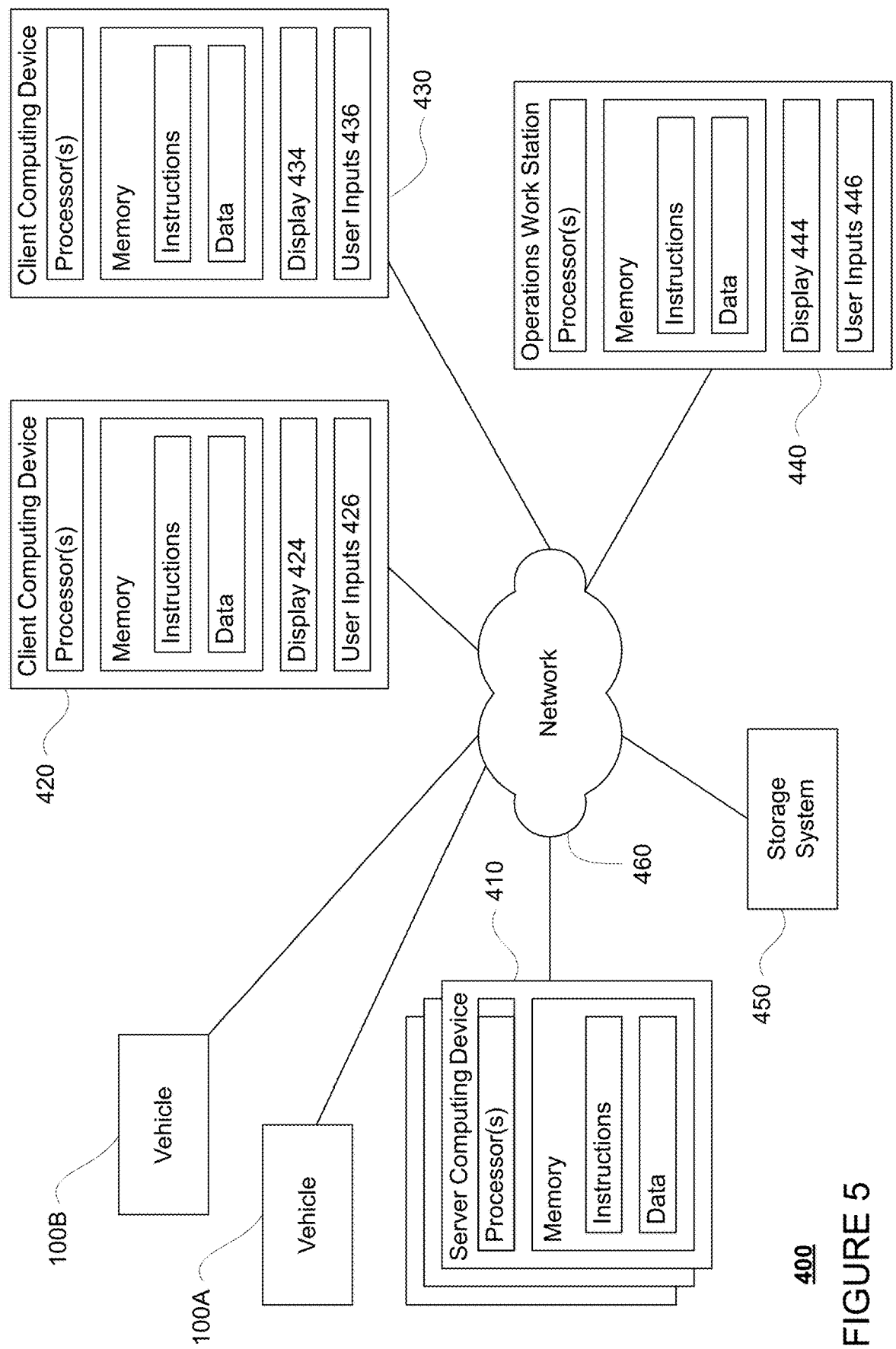
FIG. 5 is an example functional diagram of a system in accordance with aspects of the disclosure.

In some examples, client computing device 420 may be a mobile phone used by passenger of a vehicle. In other words, user 422 may represent a passenger. In addition, client communication device 430 may represent a smart watch for a passenger of a vehicle. In other words, user 432 may represent a passenger. The client communication device 430 may represent a workstation for an operations person, for example, a remote assistance operator or someone who may provide remote assistance to a vehicle and/or a passenger. In other words, user 442 may represent a remote assistance operator. Although only a few passengers and operations persons are shown in FIGS. 4 and 5, any number of such passengers and operations persons (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information which may be retrieved or otherwise accessed by a server computing device, such as one or more server computing devices 410, in order to perform various actions.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
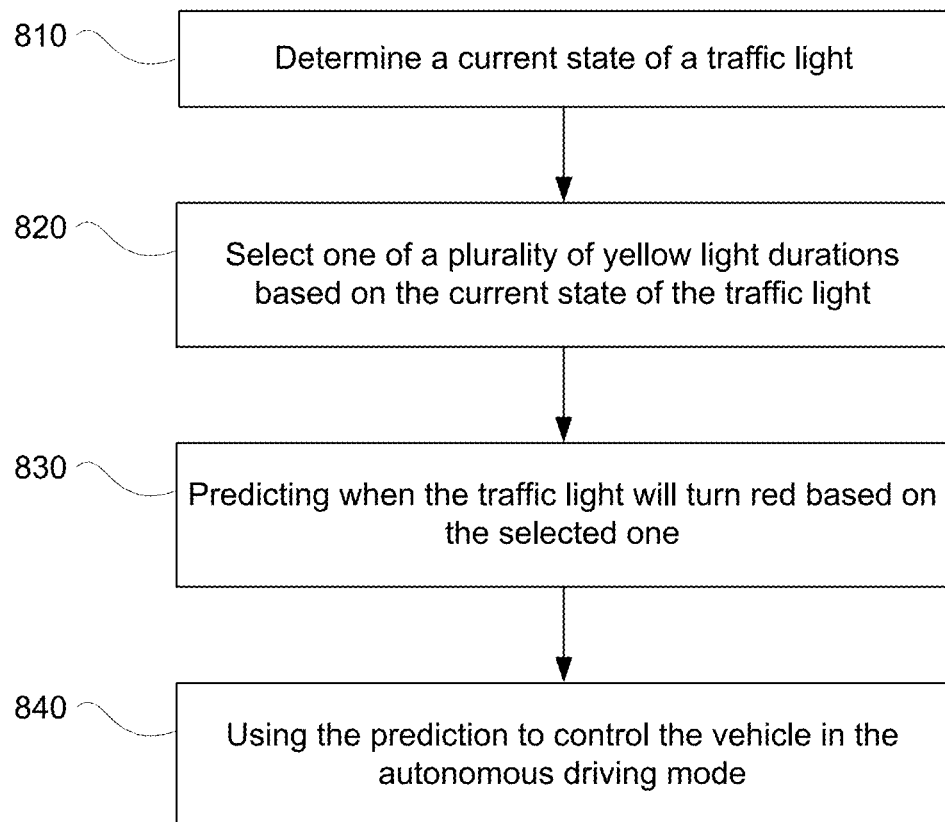
FIG. 8 is an example flow diagram in accordance with aspects of the disclosure.

FIG. 8 includes an example flow diagram 800 of some of the examples for controlling a vehicle having an autonomous driving mode, which may be performed by one or more processors such as processors 120 of computing devices 110 in order to determine when a traffic light will next turn red. For instance, at block 810, a current state of a traffic light is determined.

As an autonomous vehicle, such as vehicle 100, drives around in the autonomous driving mode, the vehicle's computing devices 110 and/or perception system 172 may detect and identify the location and current state of traffic lights. As noted above, a traffic light detection system software module may be incorporated into the perception system 172 or the computing devices 110 and may access the map information to determine where the traffic light detection system software model should expect to perceive traffic lights.

Figure 6:
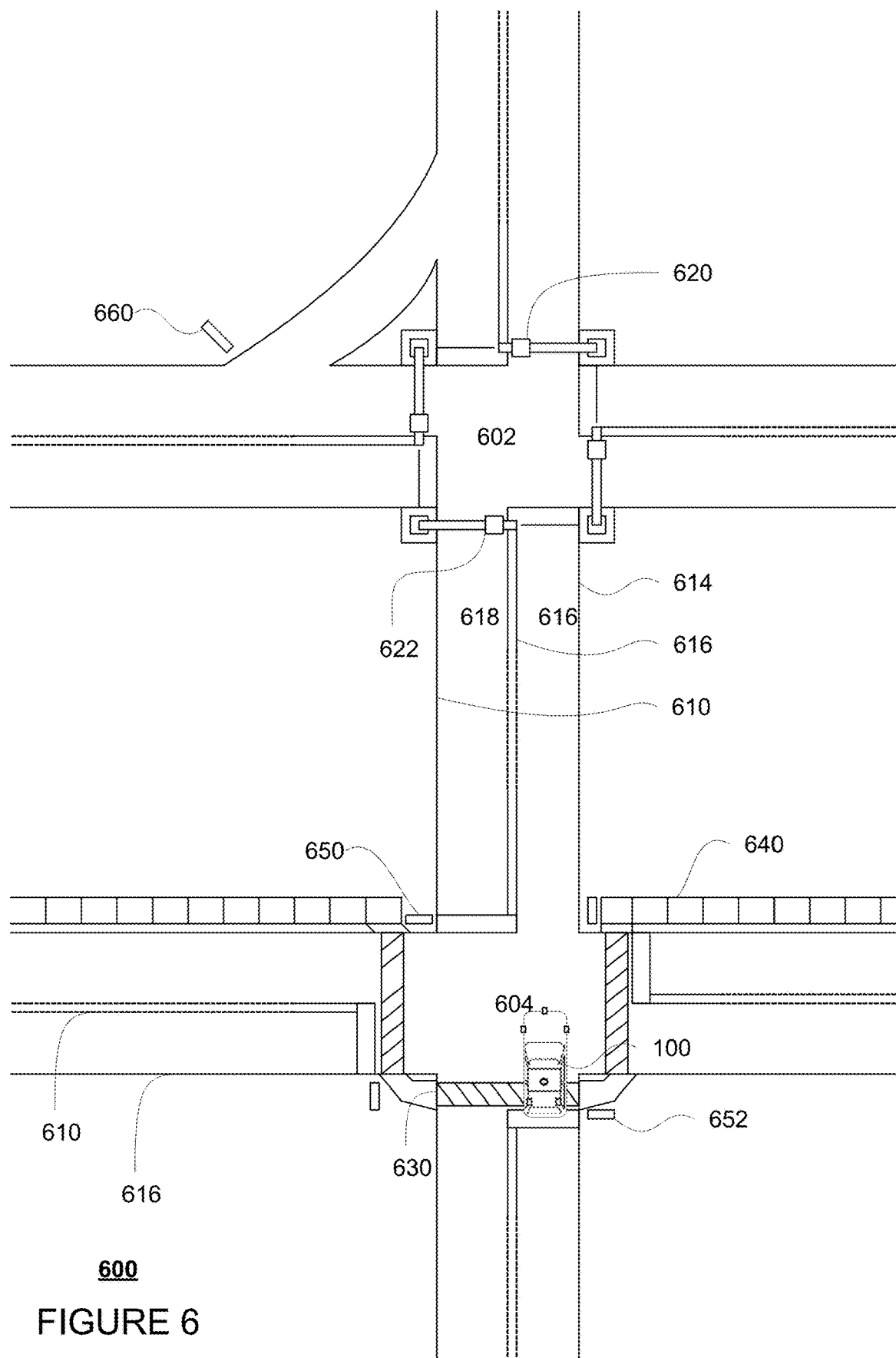
FIG. 6 is an example bird's-eye view of a geographic area in accordance with aspects of the disclosure.

FIG. 6 depicts vehicle 100 being maneuvered on a section of roadway 600 including intersections 602 and 604. In this example, intersections 602 and 604 correspond to intersections 202 and 204 of the map information 200, respectively. In this example, lane lines 610, 612, 614 and lanes 616, 618 correspond to the shape, location, and other characteristics of lane lines 210, 212, 214 and lanes 216, 218, respectively. Similarly, crosswalk 630 corresponds to the shape, location, and other characteristics of crosswalk 230, respectively; sidewalks 640 correspond to sidewalks 240; traffic lights 620, 622 correspond to traffic lights 220, 222, respectively; stop signs 650, 652 correspond to stop signs 250, 252, respectively; and yield sign 660 corresponds to yield sign 260. In this example, vehicle 100 is approaching intersection 602 which is controlled by the traffic light 620 as indicated in the map information.

The computing devices 110 and/or perception system 172 may attempt to identify the state and location of traffic lights along the route. In the example of FIG. 6, the vehicle's computing devices 110 and/or the perception system 172 may use the traffic light detection system software module may be used to attempt to locate traffic light 220 (corresponding to traffic light 620) and thereby determine the state of the traffic light 620.

As part of this, the perception system 172 may use cameras to capture images of vehicle 100's environment.

Figure 7:
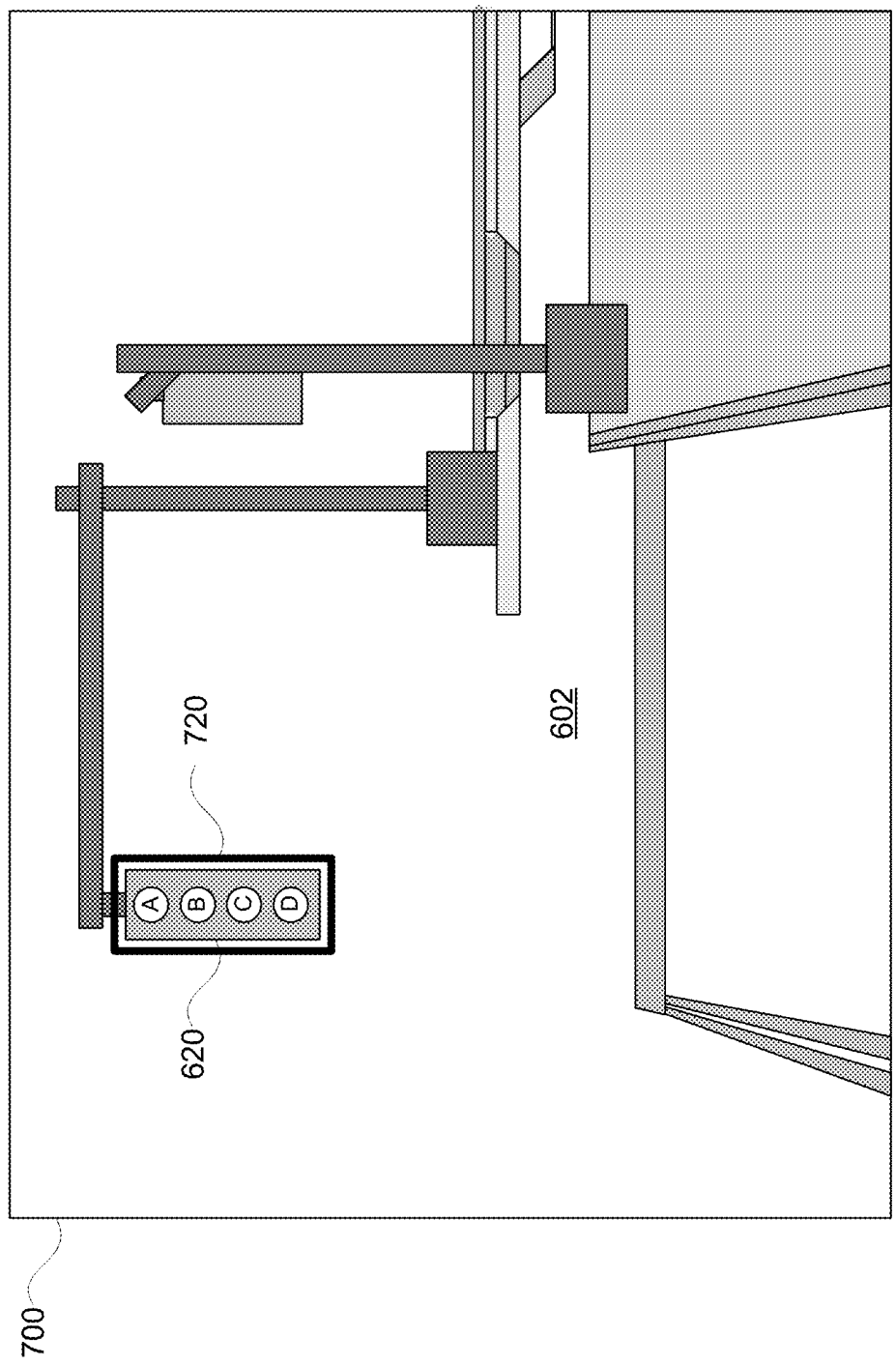
FIG. 7 is an example camera image in accordance with aspects of the disclosure.

FIG. 7 is an example camera image 700 captured by a camera of perception system 172 of vehicle 100 as the vehicle approaches intersection 602 from lane 616, for the example of FIG. 6. In this example, the camera image 700 includes the traffic light 620.

These images, as well as other information as described above, may be input into the traffic light detection system software module in order to determine the state of the traffic light 620 as well as other information such as its three-dimensional location. The state may be any number of different values, including for example, "off", "undetected", "solid red circle", "solid yellow circle", "solid green circle", "flashing red circle", "flashing yellow circle", "solid yellow arrow", "solid red arrow", "solid green arrow", "flashing yellow arrow", "flashing green arrow", etc. In this regard, "solid" refers to a light that appears solid to a human observer. In addition, each arrow (solid or flashing) may also be further delineated into its direction, such as "solid left yellow arrow", "solid left red arrow", "solid left green arrow", "flashing left yellow arrow", "flashing left green arrow", "solid right yellow arrow", "solid right red arrow", "solid right green arrow", "flashing right yellow arrow", "flashing right green arrow", etc. States such as off and undetected may correspond to traffic lights that are occluded (e.g. by another vehicle, a building or other structure, vegetation, weather conditions etc.) or further away from the vehicle than the operating range or the range that the sensor system is designed to respond or selected to respond, e.g., based on environmental conditions. This information may be published by the traffic light detection system software module and made available to the other computing devices and/or systems of the vehicle 100.

For example, the traffic light detection system may process camera image 700 and identify a region 720 of the image that includes the traffic light 620. The traffic light detection system may identify which of the four lights A, B, C, D of traffic light 620 is currently lit. This currently lit light will correspond to the state of the traffic light 620.

Returning to FIG. 8 at block 820, one of a plurality of yellow light durations is selected based on the current state of the traffic light. For instance, based on the current state of the traffic light, the computing devices 110 may use the current state of the traffic light to look up or select a duration for the next or a current yellow light. For example, if the current state of the traffic light is any type of red (e.g. solid red circle, flashing red circle, solid red arrow, flashing red arrow), the computing devices may not need to determine the duration of the next or current yellow light. In other words, for a red light, determining the duration of the next or current yellow light may not be necessary and thus may not be performed by the computing devices 110.

If the current state of the traffic light is any type of green (e.g. solid circle, flashing circle, solid arrow, flashing arrow) or a flashing yellow (e.g. flashing yellow circle or flashing yellow arrow), the computing devices may determine the duration of the next yellow light using the current state of the traffic light. In this regard, the vehicle's computing devices may access the table of traffic light durations for the traffic light and select a yellow light duration based on only the current state of the traffic light. Thus, the determination of the next yellow light duration when the current state of the traffic light is any type of green or flashing yellow is based only on the most currently detected state of the traffic light and not any prior states. This may reduce the likelihood of false determinations if the traffic light is partially occluded at different points in time which can lead to errors in the transitions actually observed by the traffic light state detection system.

As noted above, if there are a plurality of possible transitions for the traffic light, the table may store a plurality of possible yellow light durations. Thus, the computing devices 110 may select one of the plurality of yellow light durations from the table. For example, returning to the example of traffic light 620, if the current state of the traffic light is determined to be a flashing left yellow arrow (FLYA), then referring to table 1, the next yellow light duration would be Duration 1. Thus, Duration 1 may be selected. However, when the current state of the traffic light is determined to be a green arrow (GA), then referring to table 1, the next yellow light duration would be Duration 2. Thus, Duration 2 may be selected.

As another example, for example, returning to the example of traffic light 622, if the current state of the traffic light is determined to be a green arrow (GA), then referring to Table 2, the next yellow light duration would be Duration 3. Thus, Duration 3 may be selected. However, when the current state of the traffic light is determined to be a solid green circle (SGC), then referring to Table 2, the next yellow light duration would be Duration 4. Thus, Duration 4 may be selected.

Returning to FIG. 8, at block 830, the selected one is used to predict when traffic light will next turn red, and thereafter at block 840, the prediction is used to control the vehicle in the autonomous driving mode. For instance, the selected yellow light duration may then be used by the computing devices 110 to predict when the traffic light will turn red and in turn, to determine whether to stop or not for the traffic light. However, in order to provide an accurate prediction of when the traffic light may turn red, the vehicle's computing devices may continue to detect the current state of the traffic light in order to observe exactly when a solid or flashing green (arrow or circle) or flashing yellow (arrow or circle) light turns to a solid yellow light (arrow or circle). At this point in time, the vehicle's computing devices may simply add the selected yellow light duration to the point in time of the last observed solid or flashing green or flashing yellow light (arrow or circle) to predict when the traffic light will turn red. In this regard, if the last observed solid or flashing green or flashing yellow light (arrow or circle) was not detected, the vehicle's computing devices may assume that a solid yellow light could turn red at any moment and would plan accordingly.

When the traffic light is predicted to turn red may be used as input to the planning system 168 in order to decide whether to stop or not for the traffic light. Alternatively, the planning system may use the selected yellow light duration as well as the last observed solid or flashing green (arrow or circle) or flashing yellow (arrow or circle) light as input to make a prediction for when the light may turn red, which in turn informs the vehicle's decision as to whether to stop or not for the traffic light. In other words, the planning system may determine exactly whether there is enough time for the vehicle to safely proceed through an intersection when a traffic light is a solid yellow arrow or circle. The planning system may generate trajectories for the vehicle to follow into the future accordingly.

As noted above, if there are no pre-stored durations (e.g. no table) for a particular traffic light, for instance because there are not yet enough labels or observations of the duration of yellow lights for the traffic light, a default yellow light duration based on the speed of the traffic lanes at an intersection and geometry of the traffic lanes may be used by the computing devices 110.

If the current state of the traffic light is a solid yellow (e.g. a solid yellow circle or a solid yellow arrow) or rather, yellow and not flashing, the computing devices 110 may not need to determine the duration of the next yellow light. However, to determine the duration of the current yellow light, the computing devices 110 may use the state of the last solid or flashing green or flashing yellow light. In this regard, flashing yellow lights are treated like solid or flashing green lights. As such, the vehicle's computing devices may access the table of traffic light durations for the traffic light and select a yellow light duration for the current yellow light based on both the prior state of the traffic light as well as the current state of the traffic light.

Of course, over time, the state of a traffic light will change. The sensors of the perception system 172 will continue to capture sensor data, and the computing devices 110 and/or the perception system 172 may input this sensor data into the traffic light detection system software module. As such, the traffic light detection system software module may determine an updated state of the traffic light. Each time the state of the traffic light changes, the computing devices 110 may use the changed or updated state to determine the duration of the next or current yellow light so long as the updated state is not red. For instance, the computing devices 110 may select a second one of the plurality of light durations for a given traffic light based on the updated state of the traffic light. In other words, whenever the state of the traffic light changes, the computing devices 110 may reassess the duration of the next or current yellow light and determine that duration accordingly as described above.

In addition, each time a vehicle's traffic light detection system software module observes a yellow light at a traffic light, the duration of that traffic light may be determined, for instance, by the traffic light detection system software module. Simply put, this duration may be the length of time during which the traffic light detection system software module observes a yellow light, such as a solid yellow circle or a solid yellow arrow. In some instances, if the confidence in the detection of a yellow light and/or its duration is relatively high, this duration may be stored for later use by the computing devices 110, for example, by appending the duration to the table for that traffic light.

Although the examples herein relate to a vehicle's traffic light detection system observing the states of traffic lights which control traffic for a lane in which the vehicle is currently located, similar processes and techniques may be used for traffic lights which are observed by the traffic light detection system but do not control the lane in which the vehicle is currently located (e.g. traffic signals which control cross-traffic or which the vehicle has passed by and are now located behind the vehicle). Such observations may also be used to determine durations and append them to the table for that traffic light as well.

This information may also be shared with a remote computing device, such as server computing device 410. In this regard, the computing devices 110 may send, for example via network 460, the duration for a traffic light to the server computing devices 410.

The server computing devices 410 may use this information in various ways. For instance, when there is enough of a difference between the duration of the table and the appended duration, this may be used by the server computing devices 410 as a signal to flag the traffic light for additional analysis. For instance, a statistical model (e.g. mean and standard deviation) may be used to determine whether the duration of a yellow light of a traffic light deviates enough from the duration in the table for that traffic light, the traffic light can be flagged for review. Such a model may also take into account other things like occlusions, mis-detections or sun angles and in general trust the pre-stored yellow light duration unless there is a high confidence that the pre-stored duration is no longer reliable, good, usable, etc. In addition or alternatively, the server computing device can broadcast the information to other nearby vehicles or all vehicles of a fleet of vehicles.

The differences may also be used, for instance by the server computing devices 410, to determine whether there is any specific distribution, e.g., a bimodal distribution for a particular traffic light. For example, the yellow light durations may possibly change at different times of day and/or days of the week (e.g. longer during rush hour or less busy times). In this regard, in some instances, the table for a particular traffic light may include different yellow light durations not only for different states of the traffic light, but also for different times of day and/or days of the week. Thus, the current time of day and day of the week may also be used by the vehicle's computing devices to select a default yellow light value. However, in some instances, the boundary of when the durations of yellow lights switch may be challenging, and so there may need to be some way to allow uncertainty in which one is correct or allow ones near the boundary of time. In addition or alternatively, a statistical model on when the lights change durations could be built given enough observations of the different durations.

The features described herein may enable autonomous vehicles to recognize and respond to different yellow light durations for a single traffic light. This may reduce the likelihood of such vehicles from running red lights or abruptly braking at an inappropriate time.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A method comprising:
receiving, by one or more processors of one or more computing devices of a vehicle having an autonomous driving mode, a current state of a traffic light located at an intersection, the current state of the traffic light indicating whether a currently lit light of the traffic light is green, yellow, or red;
when the current state of the traffic light indicates that the currently lit light of the traffic light is green or yellow, selecting, by the one or more processors, a first yellow light duration from a plurality of yellow light durations stored in a pre-stored table associated with the traffic light, the first yellow light duration corresponding to the current state of the traffic light, wherein each yellow light duration stored in the pre-stored table corresponds to a different state of the traffic light;

predicting, by the one or more processors, when the traffic light will turn red based on the selected first yellow light duration; and controlling, by the one or more processors, the vehicle in the autonomous driving mode to stop for the traffic light or proceed through the intersection based on when the traffic light is predicted to turn red.

2. The method of claim 1, further comprising:

receiving, by the one or more processors, an updated state of the traffic light; and selecting, by the one or more processors, a second yellow light duration from the plurality of yellow light durations stored in the pre-stored table based on the updated state of the traffic light, wherein the first yellow light duration and the second yellow light duration are different.

3. The method of claim 2, wherein selecting the second yellow light duration is independent of any state of the traffic light prior to the updated state of the traffic light.

4. The method of claim 1, further comprising, determining when the traffic light was last observed in a particular state, and wherein predicting when the traffic light will turn red is further based on the determination of when the traffic light was last observed in the particular state.

5. The method of claim 4, wherein the particular state is a flashing yellow light.

6. The method of claim 4, wherein the particular state is a flashing green light.

7. The method of claim 2, wherein the first yellow light duration is for a solid green circle state of the traffic light and the second yellow light duration is for a green arrow state of the traffic light.

8. The method of claim 2, wherein the first yellow light duration is for a solid green arrow state of the traffic light and the second yellow light duration is for a flashing yellow arrow state of the traffic light.

9. The method of claim 1, further comprising:

determining, by the one or more processors, a duration of a yellow light of the traffic light; and storing the determined duration for later use.

10. The method of claim 9, further comprising, sending the determined duration to a remote computing device.

11. A system comprising:

one or more processors configured to:

receive a current state of a traffic light located at an intersection, the current state indicating whether a currently lit light of the traffic light is green, yellow, or red;

when the current state indicates that the currently lit light of the traffic light is green or yellow, select a first yellow light duration from a plurality of yellow light durations stored in a pre-stored table associated with the traffic light, the first yellow light duration corresponding to the current state of the traffic light, wherein each yellow light duration stored in the pre-stored table corresponds to a different state of the traffic light;

predict when the traffic light will turn red based on the selected first yellow light duration; and control a vehicle having an autonomous driving mode to stop for the traffic light or proceed through the intersection based on when the traffic light is predicted to turn red.

12. The system of claim 11, further comprising the vehicle.

13. The system of claim 11, wherein the one or more processors are further configured to:

receive an updated state of the traffic light; and select a second yellow light duration from the plurality of yellow light durations stored in the pre-stored table based on the updated state of the traffic light, wherein the selected first yellow light duration and the second yellow light duration are different.

14. The system of claim 13, wherein the one or more processors are further configured to select the second yellow light duration independent of any state of the traffic light prior to the updated state of the traffic light.

15. The system of claim 13, wherein the first yellow light duration is for a solid green circle state of the traffic light and the second yellow light duration is for a green arrow state of the traffic light.

16. The system of claim 13, wherein the first yellow light duration is for a green arrow state of the traffic light and the second yellow light duration is for a flashing yellow arrow state of the traffic light.

17. The system of claim 11, wherein the one or more processors are further configured to:

determine a duration of a yellow light of the traffic light; and store the determined duration for later use.

18. The system of claim 17, wherein the one or more processors are further configured to send the determined duration to a remote computing device.

19. The method of claim 1, wherein the current state of the traffic light further indicates whether the currently lit light of the traffic light is solid green, flashing green, solid yellow or flashing yellow.

20. The method of claim 1, wherein the selecting is not performed when the currently lit light of the traffic light is red.

21. The system of claim 11, wherein the current state of the traffic light further indicates whether the currently lit light of the traffic light is solid green, flashing green, solid yellow or flashing yellow.

22. The system of claim 11, wherein the first yellow light duration is not selected when the currently lit light of the traffic light is red.

* * * * *

UNITED STATES PATENT AND TRADEMARK OFFICE
CERTIFICATE OF CORRECTION

| | |
|---|---|
| PATENT NO. | : 11,845,469 B2 |
| APPLICATION NO. | : 16/915253 |
| DATED | : December 19, 2023 |
| INVENTOR(S) | : Hsiao et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 313 days.

Signed and Sealed this
First Day of July, 2025

Coke Morgan Stewart
*Acting Director of the United States Patent and Trademark Office*